United States Patent
Hough

(10) Patent No.: US 9,866,063 B2
(45) Date of Patent: Jan. 9, 2018

(54) FAULT-TOLERANT POWER DISTRIBUTION SYSTEMS FOR A MODULAR POWER PLANT

(71) Applicant: NuScale Power, LLC, Corvallis, OR (US)

(72) Inventor: Ted Hough, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 109 days.

(21) Appl. No.: 15/091,408

(22) Filed: Apr. 5, 2016

(65) Prior Publication Data

US 2017/0288453 A1 Oct. 5, 2017

(51) Int. Cl.
| | |
|---|---|
| *H02J 7/00* | (2006.01) |
| *H02J 9/00* | (2006.01) |
| *H02J 9/06* | (2006.01) |
| *H02J 3/38* | (2006.01) |
| *H02B 13/00* | (2006.01) |

(52) U.S. Cl.
CPC ............ *H02J 9/061* (2013.01); *H02B 13/005* (2013.01); *H02J 3/381* (2013.01)

(58) Field of Classification Search
USPC .............................................. 307/65; 703/18
See application file for complete search history.

(56) References Cited

U.S. PATENT DOCUMENTS

| | | | |
|---|---|---|---|
| 2008/0262820 A1* | 10/2008 | Nasle ..................... | G06Q 10/04 703/18 |
| 2009/0076749 A1* | 3/2009 | Nasle ..................... | G05B 17/02 702/62 |
| 2015/0369217 A1* | 12/2015 | Gupta ...................... | H02J 3/16 290/44 |
| 2017/0178756 A1* | 6/2017 | Ingersoll ................. | G21D 1/02 |
| 2017/0178757 A1* | 6/2017 | Hough ..................... | G21D 1/00 |
| 2017/0192398 A1* | 7/2017 | Nasle ................... | G06N 99/005 |
| 2017/0195118 A1* | 7/2017 | Perretta ................. | H04L 9/0643 |
| 2017/0207633 A1* | 7/2017 | Nakayama .............. | H02J 3/386 |
| 2017/0228653 A1* | 8/2017 | Meagher ................. | G06N 5/04 |

* cited by examiner

*Primary Examiner* — Adam Houston
(74) *Attorney, Agent, or Firm* — Lowe Graham Jones PLLC

(57) ABSTRACT

Fault-tolerant power distribution systems for modular power plants are discussed. The systems enable the transmission of a portion of the power generated by a modular power plant to remote consumers. The systems also enable the local distribution of another portion of the generated power within the power plant. The various fault-tolerant systems enable the plant to continuously, and without degradation or disruption, transmit power to remote consumers and distribute power within in the power plant in the event of one or more faults within the distribution system. The various embodiments include redundant power-transmission paths, power-distribution module feeds, switchgear, and other hardware components. Such redundant transmission paths and hardware enable the systems to continuously, and without degradation or disruption, transmit power to remote consumers and locally distribute power to the power plant when one or more faults occur within one or more of the redundant power-transmission paths and/or hardware components.

20 Claims, 6 Drawing Sheets

FAULT-TOLERANT POWER DISTRIBUTION SYSTEMS FOR A MODULAR POWER PLANT

FIELD OF THE INVENTION

The application relates to a power distribution system for a power plant and, more particularly but not exclusively, to a redundant, fault-tolerant system that distributes power generated by a plurality of power-generation module assemblies, included in a power plant, for use within the power plant.

BACKGROUND OF THE INVENTION

Power plants generate electrical power. Most of the generated power is transmitted to remote consumers. However, a portion of the generated electrical power is locally distributed to the power plant. The locally distributed power is used to operate the plant. More specifically, the locally distributed power is used to power the various electrical, mechanical, and/or pneumatic/hydraulic systems that are needed to run and ensure the efficient and safe generation of power.

Various busses, switchgear, and power-distribution modules are required to locally distribute the power to the various loads within the power plant. If a critical component of this local distribution hardware malfunctions, fails, or otherwise becomes inoperable, the power required to run the power plant may not be available. Such unavailability of local power may have significant economic impacts on the power plant. It is for these and other concerns that the following disclosure is provided.

SUMMARY OF THE INVENTION

Various embodiments are directed toward mitigating faults within the electrical distribution systems of power plants. Various embodiments increase power production capabilities, decrease operation and maintenance (O&M) costs associated with faults, and increase the overall efficiency and profitability of power plants. Various embodiments are enabled to continuously, and without degradation or disruption, provide electrical power to remote consumers, as well as to the power plant.

At least one embodiment is directed to a fault-tolerant power distribution system for locally distributing electrical power generated in a power plant to the power plant. The power plant includes a thermal source that produces thermal energy. The system may be a redundant system. For instance, the system may include at least a first generator, a first feed, a second feed, a first transmission path, a second transmission path, a first switch, and a second switch. The first generator converts a portion of the thermal energy produced by the thermal source into a first power signal. The first feed and the second feed are for a first distribution module that corresponds to the first generator. When the first transmission path is coupled to the first generator, the first transmission path transmits a first portion of the first power signal to the first feed. The first feed provides the first portion of the first power signal to the first distribution module. The first distribution module distributes electrical energy included in the first portion of the first power signal to the power plant. The first switch selectively couples and decouples the first transmission path to the first generator. When the second transmission path is coupled to the first generator, the second transmission path transmits the first portion of the first power signal to the second feed. The second feed provides the first portion of the first power signal to the first distribution module. The second switch selectively couples and decouples the second transmission path to the first generator.

ii

In various embodiments, a fault-tolerant system includes a first and a second turbine, a first and a second switchgear module, a first switch, a second switch, a third switch, and a fourth switch. The system may include a first feed for a first distribution module. The first feed is selectively coupled to the first switchgear module. The system may include a second feed for the first distribution module. The second feed is selectively coupled to the second switchgear module. The system also includes a third feed for a second distribution module. The third feed is selectively coupled to the second switchgear module. The system may include a fourth feed for the second distribution module. The fourth feed is selectively coupled to the first switchgear module. The first turbine may generate a first power signal and the second turbine may generate a second power signal.

When the first switchgear module is coupled to the first turbine, the first switchgear module transmits the first power signal. When the first switchgear module is coupled to the second turbine, the first switchgear module transmits the second power signal. When the second switchgear module is coupled to the first turbine, the second switchgear module transmits the first power signal. When the second switchgear module is coupled to the second turbine, the second switchgear module transmits the second power signal.

When the first switch is in a first state, the first switch couples the first turbine to the first switchgear module. When the first switch is in a second state, the first switch decouples the first turbine from the first switchgear module. When the second switch is in a first state, the second switch couples the first turbine to the second switchgear module. When the second switch is in a second state, the second switch decouples the first turbine from the second switchgear module.

When the third switch is in a first state, the third switch couples the second turbine to the second switchgear module. When the thirds switch is in a second state, the third switch decouples the second turbine from the second switchgear module. When the fourth switch is in a first state, the fourth switch couples the second turbine to the first switchgear module. When the fourth switch is in a second state, the fourth switch decouples the second turbine from the first switchgear module.

When the first feed is coupled to the first switchgear module and the first switchgear module transmits the first power signal, the first feed provides the first power signal to the first distribution module and the first power distribution module distributes a portion of the first power signal to the power plant. When the second feed is coupled to the second switchgear module and the second switchgear module transmits the first power signal, the second feed provides the first power signal to the first distribution module and the first distribution module distributes the portion of the first power signal to the power plant. When coupled the third feed is to the second switchgear module and the second switchgear module transmits the second power signal, the third feed provides the second power signal to the second distribution module and the second distribution module distributes a portion of the second power signal to the power plant. When the fourth feed is coupled to the first switchgear module and the second switchgear module transmits the second power signal, the fourth feed provides the second power signal to the second distribution module and the second distribution module distributes the portion of the second power signal to the power plant.

In at least one embodiment, a power plant includes a first generator that generates a first power signal, a second generator that generators a second power signal, and a third generator that generates a third power signal. Various embodiments of systems include a first, a second and a third front-end module, as well as a backend bus.

The first front-end module selectively transmits at least a portion of each of a first, the second, and the third power signals from an input of the first front-end module to an output of the first front-end module. The second front-end module selectively transmits the portion of the second power signal from an input of the second front-end module to an output of the second front-end module. The third front-end module selectively transmits the portion of each of the first and the third power signals from an input of the third front-end module to an output of the third front-end module.

The backend bus is coupled to the outputs of each of the first, the second, and the third front-end modules. The backend bus is also coupled to an input of each of a first feed and a second feed for a first distribution module. The first distribution module corresponds to the first generator. The backend bus is also coupled to a first feed and a second feed for a second distribution module. The second distribution module corresponds to the second generator. The backend bus is coupled to a first feed and a second feed for a third distribution module. The third distribution module corresponds to the third generator.

When the first front-end module is selected to transmit the portion of the first power signal, the backend bus transmits the portion of the first power signal to the first feed for the first distribution module. When the third front-end module is selected to transmit the portion of the first power signal, the backend bus transmits the portion of the first power signal to the second feed for the first distribution module. When the second front-end module is selected to transmit the portion of the second power signal, the backend bus transmits the portion of the second power signal to the first feed for the second distribution module. When the first front-end module is selected to transmit the portion of the second power signal, the backend bus transmits the portion of the second power signal to the second feed for the second distribution module. When the third front-end module is selected to transmit the portion of the third power signal, the backend bus transmits the portion of the third power signal to the first feed for the third distribution module. When the first front-end module is selected to transmit the portion of the third power signal, the backend bus transmits the portion of the third power signal to the second feed for the third distribution module.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
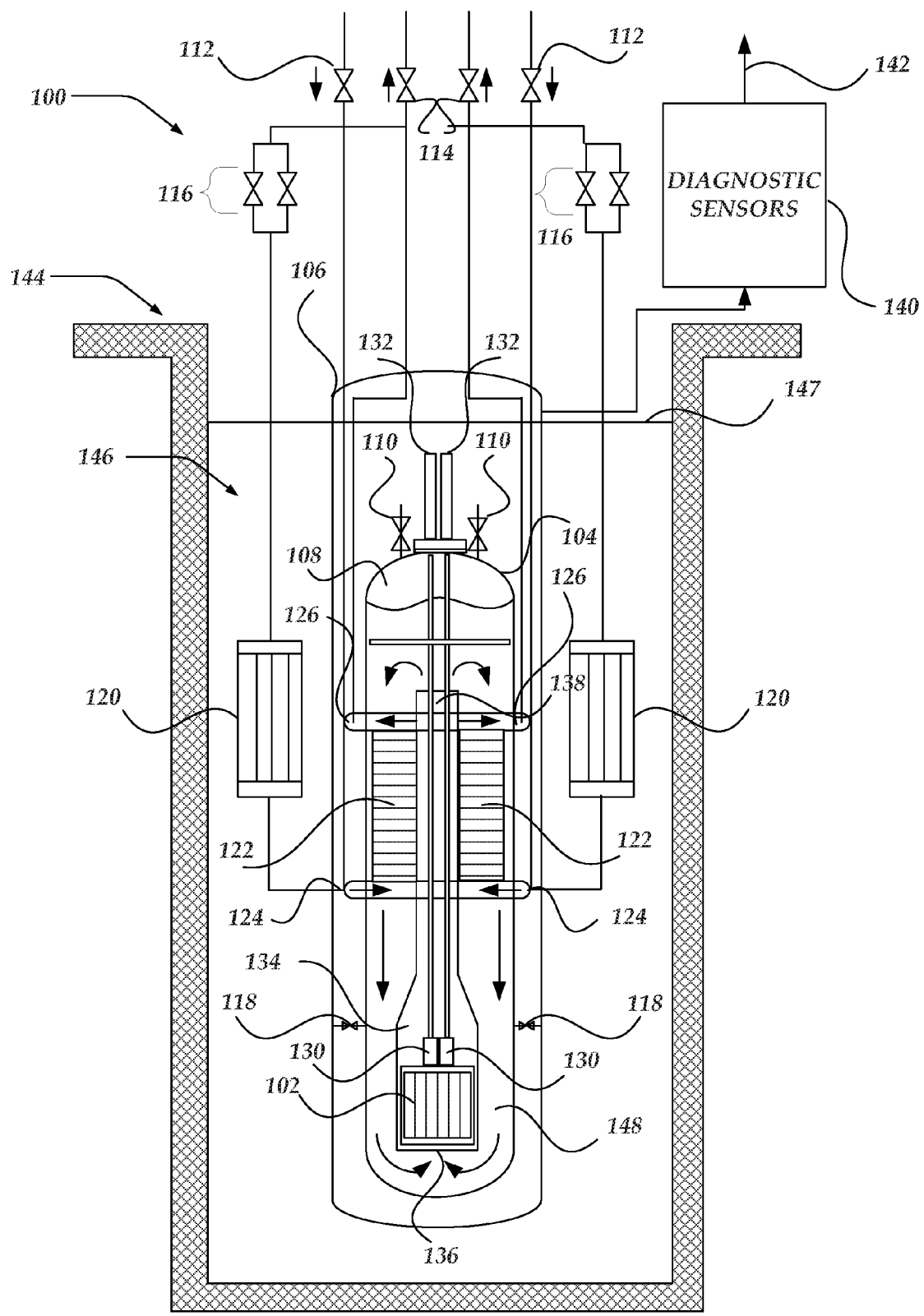
FIG. 1A provides a schematic view of a power-generation module assembly that is consistent with the various embodiments disclosed herein.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "switchgear" is used to indicate various electrical distribution components and/or hardware, such as but not limited to switches, fuses, and circuit breakers. A "switchgear module" is a module that includes a plurality of switchgear components and a switchgear module bus. A switchgear module may include one or more inputs electrically coupled to one or more outputs, via the switchgear module bus. As discussed throughout and shown in the various figures, various switchgear components, such as switches, circuit breakers, fuses, and such may be included in a switchgear module and intermediate the inputs and outputs of the switchgear module.

Briefly stated, embodiments are directed to fault-tolerant power distribution systems for modular power plants. The systems enable the transmission of a portion of the power generated by a modular power plant to remote consumers. The systems also enable the local distribution of another portion of the generated power within the power plant. The various fault-tolerant systems enable the plant to continuously, and without degradation or disruption, transmit power to remote consumers and distribute power within in the power plant in the event of one or more faults within the distribution system.

The various embodiments include redundant power-transmission paths, feeds, connections, or electrical couplings to power-distribution modules, switchgear, and other hardware components. Such redundant transmission paths and hardware enable the systems to continuously, and without degradation or disruption, transmit power to remote consumers and locally distribute power to the power plant when one or more faults occur within one or more of the redundant power-transmission paths and/or hardware components.

Various embodiments of a fault-tolerant power distribution system include one or more power-generation module (PGM) assemblies. Various embodiments also include one or more generators corresponding to each of the one or more PGM assemblies. Each of the one or more generators may be thermally coupled to a corresponding PGM assembly. Each generator is driven by steam produced by the one or more PGM assemblies. Thermal energy produced by a PGM assembly drives the corresponding generator, which in turn converts at least a portion of the PGM assembly supplied thermal energy into electrical energy or power. The power may be in the form of a power signal that is generated by the generators. The one or more power signals may be generated at one or more voltages. The systems enable the transmission of the power signals.

Various systems may include a plurality of main power transformers (MPTs). One or more MPTs transform the voltage of a portion of the power signals to a voltage that is suitable for a switchyard. The one or more MPTs may be selectively coupled to the switchyard via a transmitting bus. More specifically, one or more switches may be coupled to the inputs and/or outputs of the one or more MPTs to selectively transmit the voltage-transformed portions of the power signals to the switchyard.

Because the various embodiments are fault-tolerant, each generator may supply power to the switchyard via a plurality of power-transmission paths that include redundant MPTs. Switches may be employed to select which of the power-transmission paths to provide the switchyard with the power signals. From the switchyard, a power signal may be efficiently transmitted to remote consumers. As such, each of the generators are enabled to continuously, and without degradation or disruption, transmit power to remote consumers in the event of one or more faults.

Another portion of the generated electrical power is provided to a plurality of power-distribution modules included in the power plant. The power-distribution modules locally provide electrical power for the operation of the plant. In at least some embodiments, each of the plurality of power-distribution modules is enabled to provide direct-current (DC) power to the power plant. In some embodiments, the power-distribution modules are enabled to provide alternating-current (AC) power to the power plant. In at least one embodiment, at least a portion of the power-distribution modules are enabled to provide both DC and AC power to the power plant. The power-distribution modules may include batteries to store power, as well as battery charges to charge the batteries. The power-distribution modules may provide at least one of DC or AC power to various internal loads of the power plant, such as but not limited to actuators, pumps, motors, valves, computer devices, control-rod control devices, or any other electro- or mechanical system included in the power plant.

The various embodiments are further fault-tolerant in that in the event of one or more faults occurring in an MPT, a power-distribution module, or in any components intermediate the one or more generators and the plurality of power-distribution modules, the system continues (without degradation or disruption) to locally distribute power within the plant. Accordingly, the various embodiments are enabled to continuously locally distribute power to the switchyard and the power plant.

The various embodiments include one or more power-distribution modules corresponding to each of the one or more generators. At least one embodiment includes a plurality of redundant feeds, connections, or electrical couplings to a power-distribution modules corresponding to a generator. Various embodiments may include a separate and physically distinct power-transmission path between each generator and each of the plurality of redundant feeds to the corresponding power-distribution module. Thus, each generator is independently (and selectively) redundantly coupled to one or more corresponding power-distribution modules. For each of the generators, each of the one or more corresponding power-distribution modules is enabled to locally distribute at least a portion of the generator's power to the power plant. Accordingly, only a single corresponding power-transmission path and feed pair is required to provide power to a power-distribution module that locally distributes the generator's power, in the form of a power signal.

In at least one embodiment, at least one other transformer is intermediate to the redundant power-distribution module feeds and the power-distribution module. The intermediate transformer transformed the voltage of the power signal from the voltage that is provided to feed to another voltage that is provided to the power-distribution module. In some embodiments, the intermediate transformer may be a step-down transformer.

As long as at least one of the plurality of corresponding power-transmission paths between a generator and the corresponding power-distribution module is available, the generator can continuously provide power to the power plant. Furthermore, the power is locally distributed without disruption or degradation, when one (or more) of the corresponding redundant power-distribution module feeds, corresponding power-transmission paths, or an MPT experiences a fault or is otherwise unavailable. In this way, the fault-tolerant system may be maintained and/or repaired without loss or degradation of the locally distributed and the remotely transmitted power.

Each of the separate power-transmission paths includes modular components that may be repaired and/or replaced while the fault-tolerant system continuously distributes a portion of the generated power to the power plant and transmits another portion of the power to remote consumers. A plurality of switchgear modules and cable bus modules are employed to selectively couple each of the one or more generators to the plurality of redundant corresponding power-distribution modules feeds (and MPTs). The switchgear modules, along with a plurality of cable bus modules and unit auxiliary transformers (UAT) forms the plurality of corresponding power-transmission paths between each of the one or more generators, the plurality of redundant corresponding power-distribution modules feeds, and the switchyard. The modular nature of the various embodiments enables efficient construction and maintenance of the system.

Illustrated Operating Environment

FIG. 1A provides a schematic view of a power-generation module (PGM) assembly 100 that is consistent with the various embodiments disclosed herein. In some embodiments, PGM assembly 100 is a modular nuclear reactor assembly, although other embodiments are not so constrained and PGM assembly 100 may be any modular assembly that generates flowing energy (heat). In various embodiments, PGM assembly 100 is a modular fission reactor assembly. In at least one alternative embodiment, PGM assembly 100 is a fusion reactor.

PGM assembly 100 may be housed in a PGM bay 144. The PGM bay 144 may include a cooling pool 146 of water or some other material that includes thermal properties enabling the cooling of PGM assembly 100. At least a portion of the PGM assembly 100 may be submerged in the cooling pool 146. Accordingly, at least a portion of the PGM assembly 100 may be below the top of a water line 147 of the cooling pool.

PGM assembly 100 includes PGM core 102. PGM core 102 may be any device, assembly, apparatus, or configuration that is employed to controllably generate heat. Thus, PGM assembly 100 may be an embodiment of a heat generating assembly. In some embodiments, PGM core 102 may be a nuclear reactor core, such as but not limited to a fission reactor core. PGM core 102 may be immersed in PGM coolant 148. In at least one embodiment, PGM coolant 148 includes water or any other material that enables the flow of heat (generated by the PGM core 102) away from the PGM core 102.

In some embodiments, PGM assembly 100 includes a core shroud 134 that at least partially constrains, channels, or otherwise guides a flow of PGM coolant 148. As shown in FIG. 1A, PGM core 102 may be at least partially surrounded by the core shroud 134. The PGM core 102, the core shroud 134, and the PGM coolant 148 are housed within a pressure vessel 104.

In various embodiments, PGM core 102 generates heat that is transferred to the PGM coolant 148. As shown by the flow arrows in FIGS. 1A, heating the PGM coolant 148 in the pressure vessel 104 generates a generally vertical circular convection current of the PGM coolant 148. The core shroud 148 at least partially constrains, channels, or otherwise guides the generally vertical circular convection current of the PGM coolant 148. A pressurizer 108 may regulate the internal pressure within pressure vessel 104 that is due to at least the heating and/or the convection current of the PGM coolant 148.

The PGM core 102 heats the portion of the PGM coolant 148 that is in the lower plenum 136 of the core shroud 134. The heated PGM coolant 148 flows upward and out of the shroud riser 138. As the PGM coolant 148 flows upward, the heated PGM coolant 148 provides heat to a plurality of steam generators 122. Due to at least this heat exchange, as the heated PGM coolant 148 flows out of the shroud riser 138, the PGM coolant 148 is cooled. As shown by the flow arrows in FIG. 1A, once outside of the shroud riser 138, the PGM coolant 148 flows generally downward between the core shroud 134 and the pressure vessel 104. The convection current pulls the cooled PGM coolant 148 near the lower plenum 136 back into the core shroud 134. The PGM core 102 reheats the PGM coolant 148 such that the convection current continues to circulate and cool the PGM core 102.

The pressure vessel 104 may be housed within a containment vessel 106. The containment vessel 106 may insure the containment of material within the pressure vessel 104, including any material included in the PGM core 102, as well as the PGM coolant 148. In some embodiments, the PGM assembly 100 includes a plurality of PGM vent valves 110 and/or a plurality of PGM recirculation valves 118 to vent pressure within and/or dissipate excess heat away from the pressure vessel 104.

Feedwater may flow in a circuit that includes the steam generators 122 and electrical generators (not shown in FIG. 1A). Within the steam generators 122, the feedwater is heated to generate stream. The generated steam flows out of the steam headers 126 and carries the transferred heat away from PGM assembly 100. A plurality of steam isolation valves 114 regulate the flow of the steam away from the PGM assembly 100. The steam may be routed via a steam bus, such as but not limited to steam bus 160 of FIG. 1B, to electrical generators, such as but not limited to turbine generator 176 of FIG. 1B, to generate electrical power or some other form of usable power.

After the energy within the steam generates the electrical power, the return of the cooled feedwater to the PGM assembly 100 may be regulated via a plurality of feedwater isolation valves 112. The cooled feedwater is returned to the steam generators 122 via the feedwater headers 124, to complete the circuit.

In at least some embodiments, even after a shutdown of the PGM assembly 100, the PGM core 102 may continue to generate heat. For instance, in embodiments where the PGM core 102 includes a nuclear reactor core, the nuclear reactor core may continue to generate heat during a decay period associated with the spent fuel within the nuclear reactor core. The heat that is generated after a shutdown of the PGM assembly 100 may be decay heat. Accordingly, to ensure that the PGM core 102 and other components of the PGM assembly 100 do not overheat, at least due to decay heat, the power generated by the PGM core 102 may be dissipated.

To dissipate decay heat in some embodiments, the PGM assembly 100 includes a decay hear removal system (DHRS). The DHRS may include a plurality of DHRS heat exchangers 120 submerged in the cooling pool 146 of the PGM bay 144, as well as a plurality of a plurality of DHRS valves 116 to divert the flow of the feedwater/steam away from the steam bus.

During a shutdown of the PGM assembly 100, or during another event where it is desired to not provide the steam and/or heated feedwater to the electrical generators, the plurality of steam isolation valves 114 may be closed such that the steam and/or heated feedwater does not flow to the electrical generators. Rather, the steam and/or heated feedwater flows through the plurality of DHRS heat exchangers 120 and is cooled. The DHRS heat exchangers 120 dump the excess heat into cooling pool 146. The circular flow of feedwater through the decay heat exchangers 120 may be regulated by the plurality of DHRS valves 116.

The rate of power generation of the of the PGM core 102 may be regulated by the positioning of one or more control rods 130. The positioning of the one or more control rods 130 may be driven by control rod drives 132.

PGM assembly 100 includes a plurality of diagnostic sensors 140 schematically shown in FIG. 1A. Diagnostic sensors 140 may sense and/or generate sensor data to monitor various components of PGM module 100. Diagnostic sensors 140 may include various types of sensors, such as but not limited to temperature sensors, pressure sensors, valve configuration sensors control rod positioning sensors, radioactivity sensors, fluid and gas flow sensors, or any other sensor that monitors parameters of the PGM assembly 100. Diagnostic sensors 140 provide sensor output signals on a sensor data bus 142. Sensor output data may be diagnostic sensor data, or simply sensor data. Diagnostic sensors 140 may include safety sensors or safety-related sensors, as well as asset protection-related sensors.

Figure 1B:
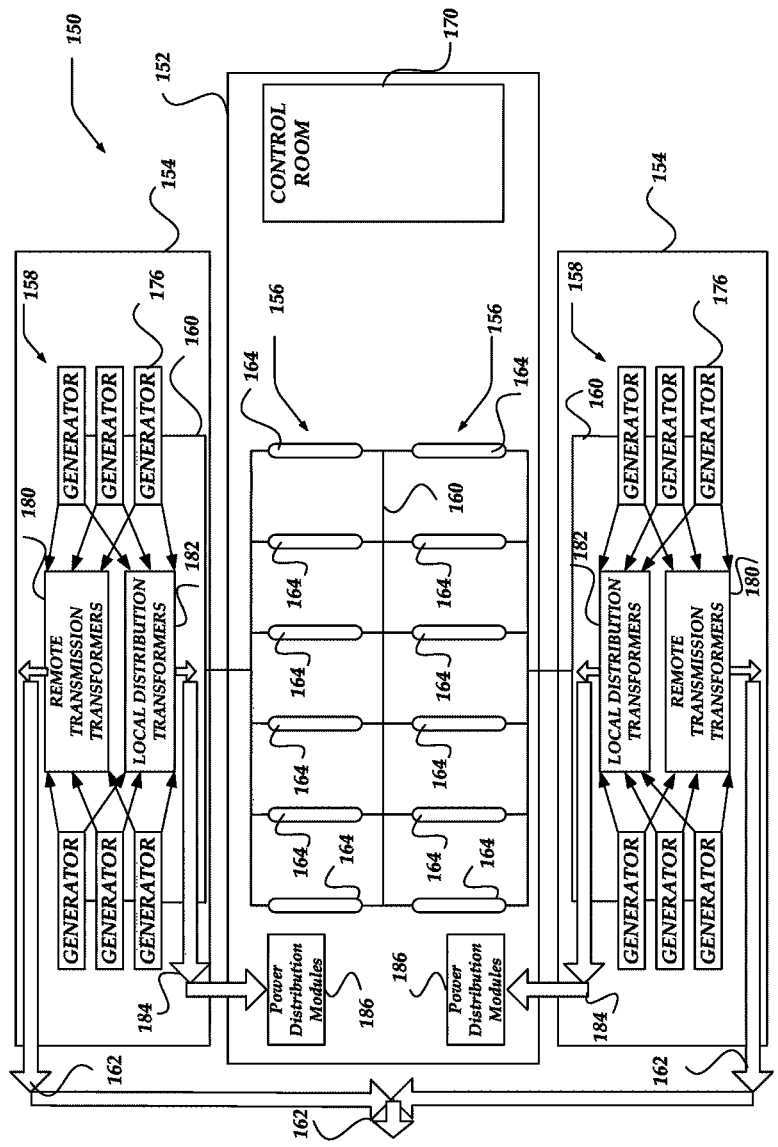
FIG. 1B provides a schematic view of a modular power plant that is consistent with the various embodiments disclosed herein.

FIG. 1B provides a schematic view of a modular power plant 150 that is consistent with the various embodiments disclosed herein. Modular power plant 150 includes power-generation module (PGM) assembly array 156. PGM assembly array 156 includes one or more PGM assemblies, such as but not limited to PGM assemblies 164. In some embodiments, at least one of the PGM assemblies 164 included in PGM assembly array 156 may include similar features to PGM assembly 100 of FIG. 1A. As shown in FIG. 1B, in at least one embodiment, PGM assembly array 156 includes twelve PGM assemblies. However, in other embodiments, the number of PGM assemblies included in PGM assembly array 156 includes more or less than twelve PGM assemblies. A PGM housing 152 may house at least a portion of the PGM assembly array 156.

In some embodiments, one or more generator housings 154 house a generator array 158. Generator array 158 includes one or more devices that generate electrical power or some other form of usable power from steam generated by the PGM assembly array 156. Accordingly, generator array 158 may include one or more electrical generators, such as but not limited to turbine generators 176. As shown in FIG. 1B, in at least one embodiment, generator array 158 includes twelve electrical generators. However, in other embodiments, the number of electrical generators included in generator array 158 includes more or less than twelve electrical generators. In at least one embodiment, there is a one to one correspondence between each PGM assembly included in PGM assembly array 156 and each electrical generator included in generator array 158.

A steam bus 160 may route the steam generated by PGM assembly array 156 to the generator array 158. The steam bus 160 may provide the one to one correspondence between the PGM assemblies included in the PGM assembly array 156 and the electrical generators included in the generator array 158. For instance, the steam bus 160 may insure that the steam generated by a particular PGM assembly is provided only to a particular electrical generator. The steam bus 160 may additionally insure that the steam provided to the particular electrical generator is generated only by the particular PGM assembly.

A portion of the power generated by each of the generators in each of the generator arrays 158 may be transmitted to remote consumers. For instance, a portion of the generated power may be provided to a switchyard and fed into a power grid to be transmitted to remote consumers. This remotely transmitted power may provide electrical power to homes, businesses, and the like.

However, at least another portion of the generated power may be used locally within power plant 150 to at least partially operate power plant 150. For instance, a portion of the generated electrical power may be distributed to various electrical loads within power plant 150. The locally distributed power may be utilized for the operation of power plant 150, such as, but not limited to, providing power to the control room 170 of power plant 150.

In order to match the transmission voltages of the switchyard and a power grid, the portion of the power generated by each generator to be remotely transmitted is routed, via a power signal, to one or more remote voltage transmission transformers 180. Because the transmission of electrical power may be more efficient at higher voltages, in some embodiments, the one or more remote transmission transformers 180 may be step-up transformers.

FIG. 1B shows the remotely transmitted power portion from each of the generators routed to remote transmission transformers 180. After the voltage is transformed to a transmission voltage, the power to be remotely transmitted is routed, via a remote transmission bus 162 to a switchyard (not shown). Because remote transmission transformers 180 provide power for the end users of power plant 150, transformers included in the remote transmission transformers 180 may be main power transformers (MPTs).

In order to provide local power at appropriate voltages within power plant 150, the portion of the power generated by each generator to be locally distributed is routed, via a power signal, to one or more local distribution voltage transformers 182. Because the various loads within power plant 150 may require voltages less than the voltage that is output by the generators, the one or more local distribution transformers 182 may be step-down transformers. The transformers included in the local distribution transformers 182 may be unit auxiliary transformers (UATs).

FIG. 1B shows the locally distributed portion of the power signal from each of the generators routed from the generators to local distribution transformers 182. After the voltage of the power signal is transformed to one or more local distribution voltages, the power signal to be locally distributed is routed, via a local distribution bus 184, to one or more power-distribution modules 186. The power-distribution modules 186 provide power to the various loads within power plant 150.

Fault-Tolerant Power Distribution Systems

FIGS. 2-4B are one-line power-distribution diagrams. As such, structures, features, and components are shown in somewhat schematic representations. The various embodiments may include more (or less) components and features as shown in FIGS. 2-4B. Accordingly, each switchgear module, cable bus module, and other structures shown in the various figures may include more or less components, such as switches, breakers, busses, connections, and input/output terminals. Only single conducting (or power transmission) paths are represented. However, several conducting paths, input/output terminals, and the like may be present in the various embodiments. An input terminal, output terminal, or other sort of connection may be shown to schematically represent multiple inputs, outputs, or other connections. Busses or transmission paths may be shown as a single line but include several separate and distinct transmission paths to transmit separate power signals from separate sources to separate destinations. The various power signals may be multi-phase signals, such as three-phase signals. One-line diagrams are used throughout for simplicity and clarity in presentation.

Figure 2:
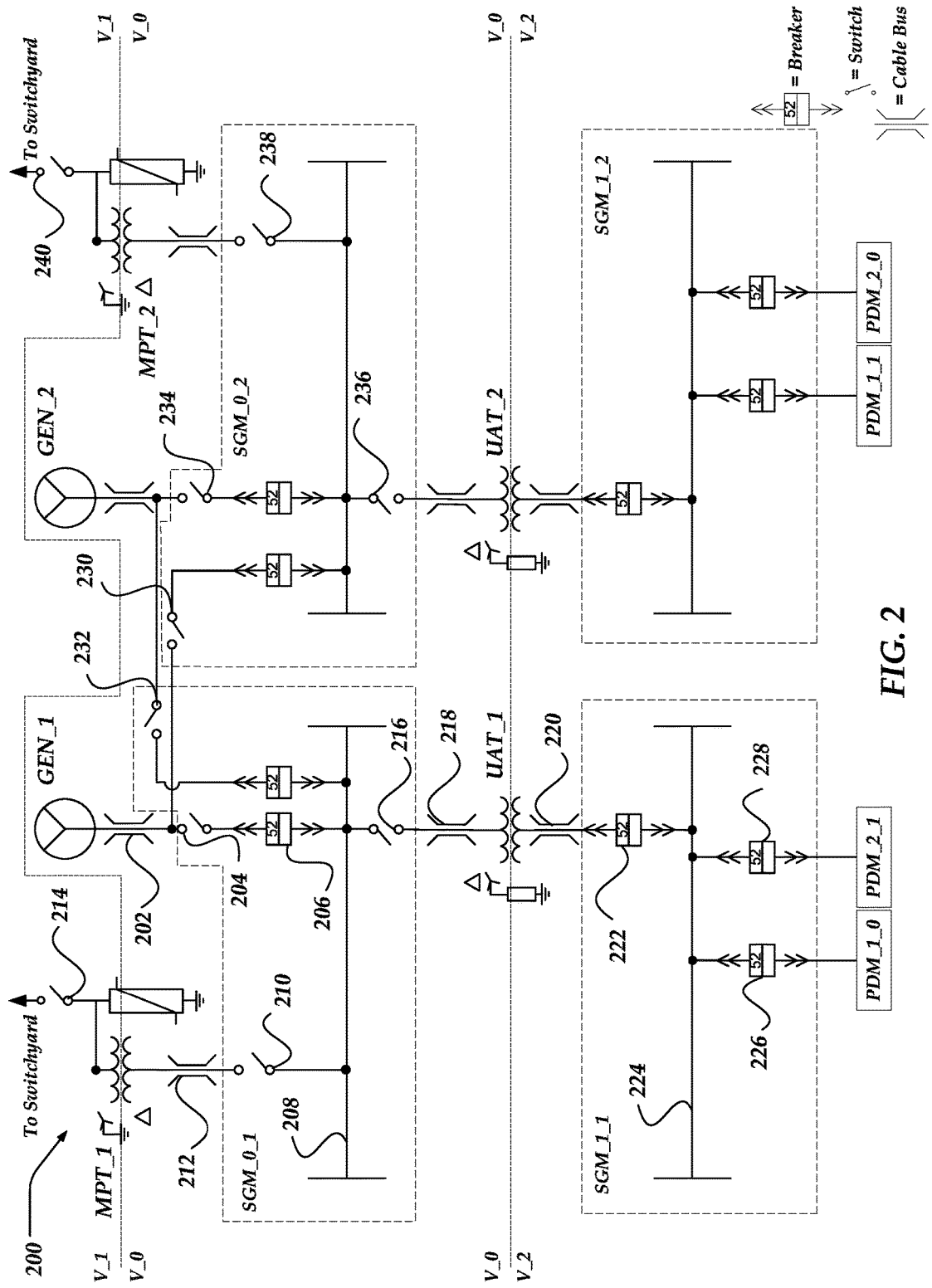
FIG. 2 shows a one-line schematic diagram for a fault-tolerant power distribution system that distributes locally generated power for the operation of a power plant that is consistent with the various embodiments discussed herein.

FIG. 2 shows a one-line schematic diagram for a fault-tolerant power distribution system 200 that distributes locally generated power for the operation of a power plant that is consistent with the various embodiments discussed herein. System 200 transmits a portion of the power generated within a modular power plant, such as but not limited to power plant 150 of FIG. 1B, to remote consumers. System 200 also distributes another portion of the generated power locally within the modular power plant.

System 200 includes redundant power-transmission paths, switchgear, and other hardware components. Such redundant transmission paths and hardware enable system 200 to continuously, and without degradation or disruption, transmit power to remote consumers and locally distribute power to the power plant when one or more faults occur within one or more of the redundant power-transmission paths and/or hardware components.

Various embodiments of fault-tolerant power distribution system 200 includes one or more power-generation module (PGM) assemblies, such as but not limited to PGM assembly 164 of power plant 150. Because a PGM assembly produces or generates thermal energy, a PGM assembly may be a thermal source.

System 200 also includes one or more generators corresponding to each of the one or more PGM assemblies. Such generators may include but are not otherwise limited to a generator included in generator array 158 of power plant 150. For instance, system 200 may include at least two generators: GEN_1 and GEN_2.

Each of GEN_1 and GEN_2 may be thermally coupled to a corresponding PGM assembly, such as but not limited to PGM assembly 100 of FIG. 1A. The thermal coupling between corresponding PGM assemblies and generators may be enabled via a steam bus, such as but not limited to steam bus 160 of FIG. 1B. In some non-limiting embodiments, at least one of GEN_1 or GEN_2 is a turbine generator. Each generator is driven by steam produced by one of the two PGM assemblies within the power plant. Thermal energy produced by a PGM assembly drives the corresponding generator, which in turn converts at least a portion of the PGM assembly supplied thermal energy into electrical energy or power. Each of the generators may generate one or more power signals at one or more voltages. In at least one embodiment, GEN_1 and GEN_2 each generate a separate power signal at voltage V_0.

As noted above, a portion of the generated electrical power (in the form of a portion of the power signals generated by the generators) is transmitted to remote consumers. As such, one or more main power transformers (MPT), such as but not limited to MPT_1 and MPT_2, transforms the voltage of a portion of the power signals generated by the one or more generators to a voltage that is suitable for a switchyard. For instance, as indicated in FIG. 2, prior to proving the power signal to the switchyard, at least one of MPT_1 and MPT_2 may transform the voltage of a portion of the power signals generated by GEN_1 and GEN_2 from V_0 to V_1. In some embodiments, V_0 may be approximately 13.8 kV. V_1 may be approximately 345 kV. The MPTs may be multi-phase transformers and thus include multiple primary and multiple secondary windings. As show in FIG. 2, the MPTs may include wye-connected (grounded) secondary windings. The MPTs may further include delta-connected (ungrounded) primary windings.

The one or more MPTs may be included in the remote transmission transformers 180 of power plant 150. The one or more MPTs may be selectively coupled to a switching substation (the switchyard) via a transmitting bus, such as but not limited to remote transmission bus 162 of power plant 150. As shown in FIG. 2, one or more switches may be coupled to the inputs and/or outputs of the one or more MPTs to selectively transmit the voltage-transformed portions of the power signals to the switchyard. For instance, switches 204 and 210 (included in switchgear module SGM_0_1) selectively couple GEN_1 to an input of MPT_1. Switch 214 selectively couples an output of MPT_1 to the switchyard.

As discussed herein, system 200 is a fault tolerant system. As such, GEN_1 may supply power to the switchyard via an alternative power-transmission path that does not include MPT_1 (and SGM_0_1), but rather includes at least MPT_2 (and SGM_0_2). Switches 230 and 238 (included in switchgear module SGM_0_2) selectively couple the output of GEN_1 to an input of MPT_2. Switch 240 selectively couples an output of MPT_2 to the switchyard. From the switchyard, a power signal may be efficiently transmitted to remote consumers.

As shown in FIG. 2, GEN_2 is also redundantly coupled to the switchyard via a first power-transmission path that includes MPT_2 (and SGM_0_2), as well as coupled to the switchyard via an alternative power-transmission path that does not include MPT_2, but rather includes at least MPT_1 (and SGM_0_1).

Thus fault-tolerant system 200 enables both GEN_1 and GEN_2 to continuously, and without degradation or disruption, transmit power to remote consumers in the event of one or more faults. Such fault may occur within any of SGM_0_1, SGM_0_2, MPT_1, MPT_2, or any of the other components included in redundant power-transmission paths, such as but not limited to cable bus modules 202 and 212.

Also noted above, another portion of the generated electrical power is provided to a one or more power-distribution modules (via another portion of the generated power signals), such as power-distribution modules 186 of power plant 150.

The power-distribution modules locally provide electrical power for the operation of the plant. System 200 is further fault-tolerant in that in the event of one or more faults occurring in an MPT, a power-distribution module, or in any components intermediate the one or more generators and the plurality of power-distribution modules. System 200 is enabled to continuously, and without degradation or disruption, locally distribute power to the power plant (and to the switchyard), without interruption or degradation.

System 200 includes two or more (redundant) feeds, connections, or electrical couplings to each power-distribution module. As shown in FIG. 2, system 200 includes two separate and distinct feeds (PDM_1_0 and PDM_1_1) for a power-distribution module that each corresponds to GEN_1. Likewise, system 200 includes two separate and distinct feeds (PDM_2_0 and PDM_2_1) for a power-distribution module that corresponds to GEN_2. The power-distribution module that corresponds to GEN_1 and the other power-distribution module that corresponds to GEN_2 is not shown in FIG. 2. As discussed above, in order to redundantly provide power to the switchyard, system 200 includes two or more separate and distinct MPTs that correspond to each of the one or more generators. For instance, in system 200, each of MPT_1 and MPT_2 corresponds to each of GEN_1 and GEN_2.

System 200 includes a separate and physically distinct power-transmission path between each generator and each of the redundant feeds corresponding to each of the power-distribution modules. Power-transmission paths transmit at least portions of the power signals generated by GEN_1 and GEN_2. Each of the redundant feeds provide at least a portion of this power to the corresponding power-distribution module. Thus, each generator is independently (and selectively) coupled to at least one power-distribution module. Furthermore, at least one power-distribution module corresponds to each generator. For each of the generators, each of the one or more corresponding power-distribution modules is enabled to locally distribute at least a portion the generator's power to the power plant. Accordingly, only a single corresponding power-transmission path and the corresponding feed to the power-distribution module pair is required to locally distribute the generator's power, in the form of a power signal.

As long as at least one of the plurality of corresponding power-transmission paths between a generator and the corresponding feed to the power-distribution module is available, the generator can continuously provide power to the power plant. Furthermore, the power is locally distributed without disruption or degradation, when one (or more) of the corresponding redundant feeds to power-distribution module, corresponding power-transmission paths, or an MPT experiences a fault or is otherwise unavailable. In this way, the fault-tolerant system may be maintained and/or repaired without loss or degradation of the locally distributed and the remotely transmitted power.

Each of the separate power-transmission paths includes modular components that may be repaired and/or replaced while the fault-tolerant system continuously distributes a portion of the generated power to the power plant and transmits another portion of the power to remote consumers. A plurality of switchgear modules are employed to selectively couple each of the one or more generators to the plurality of corresponding power-distribution modules (and MPTs). Furthermore, cable bus modules are used to electrically couple the switchgear modules. The switchgear modules, along with a plurality of cable bus modules and unit auxiliary transformers (UAT) forms the plurality of corresponding power-transmission paths between each of the one or more generators, the plurality of corresponding power-distribution modules, and the switchyard.

For instance, as shown in FIG. 2, switchgear modules SGM_0_1 and SGM_1_1, along with UAT_1 (and cable bus modules 202, 218, and 220) form a first power-transmission path (PATH_1_0) between GEN_1 and a first power-distribution feed (PDM_1_0) to the power-distribution module that corresponds to GEN_1. PATH_1_0 selectively transmits at least a portion of the power signal generated by GEN_1 to the corresponding power-distribution module via power-distribution module feed PDM_1_0. As discussed herein, the corresponding power-distribution module may locally distribute that power included in the power signal transmitted via PATH_1_0 within the power plant.

Note that SGM_0_1 includes a first portion of PATH_1_0 and SGM_1_1 includes a second portion of PATH_1_0. Furthermore, because SGM_0_1 and SGM_0_2 are in the "front-end" of system 200, SGM_0_1 and SGM_0_2 may be front-end modules. Similarly, SGM_1_1 and SGM_1_2 are in the "backend" of the system 200. Thus, SGM_1_1 and SGM_1_2 may be backend modules.

At least switches 204 and 216, included in SGM_0_1, are employed to select PATH_1_0 for the transmission of the power signal, generated by GEN_1, to feed PDM_1_0. For instance, when switches 204 and 216 are each in a "closed" state, at least a portion of the power signal generated by GEN_1 may be transmitted to feed PDM_1_0 and to the power-distribution module that distributes the power locally within the power plant. Additionally, when switches 210 and 214 are in the "closed" state, another portion of the power signal generated by GEN_1 may be transmitted to the switchyard via power-transmission path PATH_3_0 that includes MPT_1.

Alternatively, switchgear modules SGM_0_2 and SGM_1_2, along with UAT_2 (and the corresponding cable bus modules) form a second power-transmission path (PATH_1_1) between GEN_1 and a second power-distribution module feed (PDM_1_1) that corresponds to GEN_1. PATH_1_1 selectively transmits at least a portion of the power signal generated by GEN_1 to the power-distribution module that corresponds to GEN_1 via power-distribution module PDM_1_1. The corresponding power-distribution module is enabled to locally distribute the power included in the power signal within the power plant. Note that SGM_0_2 includes a first portion of PATH_1_1 and SGM_1_2 includes a second portion of PATH_1_1.

At least switches 230 and 236, included in SGM_0_2, are employed to select PATH_1_1 for the transmission of the power signal, generated by GEN_1, to power-distribution module feed PDM_1_1. For instance, when switches 230 and 236 are each in a "closed" state, at least a portion of the power signal generated by GEN_1 may be transmitted to feed PDM_1_1. Additionally, when switches 238 and 240 are in the "closed" state, another portion of the power signal generated by GEN_1 may be transmitted to the switchyard via power-transmission path PATH_3_1 that includes MPT_2.

At least portions of each of PATH_1_0 and PATH_1_1 may be included in the connections schematically represented in FIG. 1B between the generators and remote transmission transformers 180/local distribution transformers 182 of power plant 150. At least portions of SGM_1_0 and SGM_2_0 may be included in local distribution bus 184 of power plant 150.

Accordingly, in the event of a fault with (or unavailability of) any of MPT_1, MPT_2, feed PDM_1_1, or any component included in PATH_1_1, GEN_1 may still provide power to the power plant via PATH_1_0, feed PDM_1_0, and the corresponding power-distribution module. GEN_1 may also provide power to the switchyard via PATH_3_0 and MPT_1. Similarly, system 200 tolerates faults in (or unavailability of) any of MPT_1, MPT_2, feed PDM_1_0, or any component included in PATH_1_0, (such as but not limited to SGM_0_1, SGM_1_1, cable bus modules 202, 218, 220, or UAT_1). During such faults, GEN_1 may still provide power to the power plant via PATH_1_1 and feed PDM_1_1 and power to the switchyard via PATH_3_1 and MPT_2.

Thus, PATH_1_0 and power-distribution module feed PDM_1_0 each correspond to GEN_1 and form a first power-transmission path and power-distribution module pair that corresponds to GEN_1. Likewise, PATH_1_1 and PDM_1_1 also each correspond to GEN_1 and form a second power-transmission path and power-distribution module pair that corresponds to GEN_1. Furthermore, PATH_1_0 that includes feed PDM_1_0, as well as PATH_1_1 that includes feed PDM_1_1 each correspond to the power-distribution module that locally distributes power generated by GEN_1. The first and second transmission path/power-distribution feed pairs that correspond to GEN_1 are redundant pairs so that system 200 can tolerate faults when GEN_1 is generating power to locally distribute within the power plant. In addition, PATH_3_0 and PATH_3_1 are redundant pairs of power-transmission paths so that system 200 can tolerate faults when GEN_1 is generating power to transmit to remote consumers.

Switches 204, 216, 230, and 236 may be employed to select the PATH_1_0/PDM_1_0 power distribution option or the PATH_1_1/PDM_1_1 power distribution option, based on one or more fault events within the power plant. For instance, when each of switches 204 and 216 is in the "closed" state and at least one of switches 230 or 236 is in an "open" state, the PATH_1_0/PDM_1_0 option is selected over the PATH_1_1/PDM_1_1 option. Conversely, when each of switches 230 and 236 is in the "closed" state and at least one of switches 204 or 216 is in an "open" state, the PATH_1_1/PDM_1_1 option is selected over the PATH_1_0/PDM_1_0 option.

Thus, system 200 enables GEN_1 to continuously provide power to the power plant in the event of one or more faults. UAT_1 and UAT_2 may include local distribution transformers included in the power plant, such as but not limited to local distribution transformers 182 of power plant 150.

In a similar manner, switchgear modules SGM_0_2 and SGM_1_2, along with UAT_2 (and associated cable bus modules) form a power-transmission path (PATH_2_0) between GEN_2 and a first power-distribution module (PDM_2_0) that corresponds to GEN_2. Switchgear modules SGM_0_1 and SGM_1_1, along with UAT_1, form another power-transmission path (PATH_2_1) between GEN_2 and a second power-distribution module (PDM_2_1) that corresponds to GEN_2. Note that SGM_0_2 includes a first portion of PATH_2_0 and SGM_1_2 includes a second portion of PATH_2_0. In addition, SGM_0_1 includes a first portion of PATH_2_1 and SGM_1_1 includes a second portion of PATH_2_1.

Accordingly, in the event of a fault with (or unavailability of) any of MPT_1, MPT_2, PDM_2_1, or any component included in PATH_2_1, GEN_2 may still provide power to the power plant via PATH_2_0 and power-distribution module feed PDM_2_0. Similarly, in the event of a fault with (or unavailability of) any of MPT_1, MPT_2, PDM_2_0, or any component included in PATH_2_0, GEN_2 may still provide power to the power plant via PATH_2_1 and power-distribution module feed PDM_2_1.

PATH_2_0 and power-distribution module feed PDM_2_0 each correspond to GEN_2 and form a first power-transmission path and power-distribution module feed pair that corresponds to GEN_2. Likewise, PATH_1_1 and power-distribution module feed PDM_1_1 also each correspond to GEN_1 and form a second power-transmission path and power-distribution module feed pair that corresponds to GEN_2. Furthermore, PATH_2_0 that includes feed PDM_2_0, as well as PATH_2_1 that includes feed PDM_2_1 each correspond to the power-distribution module that locally distributes power generated by GEN_2. The first and second transmission path/power distribution pair that correspond to GEN_2 are redundant pairs. System 200 enables GEN_2 to continuously provide power to the power plant in the event of one or more faults.

Furthermore, as noted above, two or more redundant power-transmission paths exist between each generator and the switchyard. Switches 204, 210, and 214 selects power-transmission path PATH_3_0 (that includes MPT_1) for the transmission of a portion of the power signal generated by GEN_1 to the switchyard. Conversely, switches 230, 238, and 240 selects power-transmission path PATH_3_1 (that includes MPT_2) for the transmission of the portion of the power signal generated by GEN_1 to the switchyard. Similarly, switches 234, 238, and 240 selected power-transmission path PATH_4_0 (that includes MPT_1) for the transmission of a portion of the power signal generated by GEN_2 to the switchyard. Conversely, switches 232, 210, and 214 selects power-transmission path PATH 4_1 (that includes MPT_1) for the transmission of the portion of the power signal generated by GEN_2 to the switchyard.

GEN_1 is electrically coupled, via one or more cable bus modules 202, to switchgear module SGM_0_1. Similarly, GEN_2 is electrically coupled, via one or more cable bus modules, to switchgear module SGM_0_2. As discussed herein, SGM_0_1 and SGM_0_2 may include similar features. SGM_0_1 includes an internal switchgear module bus 208.

A first switch 204, included in SGM_0_1, is employed to selectively couple and decouple cable bus module 202 from SGM_0_1. Cable bus module is coupled to the output of GEN_1. Accordingly, switch 204 may selectively couple and decouple GEN_1 to SGM_0_1. To safeguard SGM_0_1 from at least one of an over current event or an over voltage event or condition generated via GEN_1, a first breaker 206, included in SGM_0_1, may isolate GEN_1 from SGM_0_1. As shown in FIG. 2, SGM_0_2 includes a similar configuration of breakers and switches. Effectively, switch 204 and breaker 206 couples and decouples GEN_1 from switchgear module bus 208.

A second switch 210, also included in SGM_0_1, selectively couples and decouples switchgear module bus 208 from another cable bus module 212 that is coupled to a first main power transformer (MPT_1). MPT_1 transforms the voltage of at least a portion of the power generated by GEN_1 to one or more other voltages, including at least voltage V_1. A switch 214 selectively couples and decouples the output of MPT_1 to a switchyard so that at least a portion of the power generated by GEN_1 may be transmitted to a plurality of remote consumers.

In at least one embodiment, MPT_1 is a step-up transformer to match the voltage of the switchyard. In a similar configuration of switches, breakers, and cable bus modules, GEN_2 is selectively coupled and decoupled to another main power transformer MPT_2 and to the switchyard.

A third switch 216 included in SGM_0_1 selectively couples and decouples switchgear module bus 208 from cable bus module 218 that is coupled to a first unit auxiliary transformer (UAT_1). UAT_1 transforms the voltage of a portion of the power generated by GEN_1 (V_0) to one or more other voltages, including at least voltage V_2. In at least one embodiment, UAT_1 is a step-down transformer and provides voltages appropriate for local distribution within a power plant, such as but not limited to power plant 150. In some embodiments, V_2 may be approximately 4.2 kV. Similarly, the internal switchgear module bus of SGM_0_2 is selectively coupled to a second unit auxiliary transformer (UAT_2). The output of UAT_1 is coupled, via cable bus module 220, to another switchgear module (SGM_1_1).

The internal switchgear module bus 224 is protected from an over voltage/current event generated by UAT_1 via breaker 222. Power-distribution module feed PDM_1_0 is coupled to switchgear module bus 224 and protected via breaker 226. Similarly, power-distribution module feed feed PDM_2_1 is coupled to switchgear module bus 224 and protected via breaker 228. Thus, the output UAT_1 is selectively coupled to each of feeds PDM_1_0 and PDM_2_1. Accordingly, GEN_1 is enabled to provide power to the power plant via PATH_1_0 and feed PDM_1_0. PATH_1_0/PDM_1_0 are selected by at least switches 204 and 206. The output of UAT_2 is similarly selectively coupled to feed PDM_1_1 and feed PDM_2_0 by SGM_1_2 that includes a similar set of breakers and cable bus modules.

GEN_1 is selectively coupled to SGM_0_1 via switch 230. Thus, GEN_1 is enabled to provide power to the power plant via PATH_1_1 and feed PDM_1_1. PATH_1_1/PDM_1_1 are selected by at least switches 230, 234, and 236. Likewise, GEN_2 is enabled to provide power to the power plant via PATH_2_0 and feed PDM_2_0. PATH_2_0/PDM_2_0 are selected by at least switches 234 and 236.

GEN_2 is also enabled to provide power to the power plant via PATH_2_1 and feed PDM_2_1. PATH_2_1/PDM_2_1 is selected by at least switches 232, 204, and 216.

Accordingly, when system 200 is fully functional (STATE_0), GEN_1 may provide power to the power plant via the power-distribution module corresponding to GEN_1 (through PATH_1_0 and feed PDM_1_0). GEN_2 may provide power to the power plant via the power-distribution module corresponding to GEN_2 (through PATH_2_0 and feed PDM_2_0). The states of the switches in STATE_0 are as follows: switch 204 (CLOSED), switch 216 (CLOSED), switch 230 (OPEN), switch 232 (OPEN), switch 234 (CLOSED), and switch 236 (CLOSED). Thus, in STATE_0, PATH_1_0 and PATH_2_0 are closed power transmitting pathways. In STATE_0, PATH_1_1 and PATH_2_1 are open power transmitting pathways. Switches 210 and/or 238 may be OPEN or CLOSED to isolate MPT_1 and/or MPT_2.

When PATH_1_0 and/or power-distribution module feed PDM_1_0 are in a fault or unavailable condition or state, system 200 may be transitioned from STATE_0 to STATE_1. In STATE_1, GEN_1 provides power to the power plant via the power-distribution module corresponding to GEN_1 (through PATH_1_1 and feed PDM_1_1). GEN_2 provides power to the power plant via the power-distribution module corresponding to GEN_2 (through PATH_2_0 and feed PDM_2_0). The states of the switches in STATE_1 are as follows: switch 204 (OPEN), switch 216 (CLOSED or OPEN), switch 230 (CLOSED), switch 232 (OPEN), switch 234 (CLOSED), and switch 236 (CLOSED). Thus, in STATE_1, PATH_1_1 and PATH_2_0 are closed power transmitting pathways. In STATE_1, PATH_1_0 and PATH_2_1 are open power transmitting pathways.

When PATH_2_0 and/or power-distribution module feed PDM_2_0 are in a fault or unavailable condition or state, system 200 may be transitioned from STATE_0 to STATE_2. In STATE_2, GEN_1 provides power to the power plant via the power plant via the power-distribution module corresponding to GEN_1 (through PATH_1_0 and PDM_1_0). GEN_2 provides power to the power plant via the power plant via the power-distribution module corresponding to GEN_2 (through PATH_2_1 and PDM_2_1). The states of the switches in STATE_2 are as follows: switch 204 (CLOSED), switch 216 (CLOSED), switch 230 (OPEN), switch 232 (CLOSED), switch 234 (OPEN), and switch 236 (CLOSED or OPEN). Thus, in STATE_2, PATH_1_0 and PATH_2_1 are closed power transmitting pathways. In STATE_2, PATH_1_1 and PATH_2_0 are open power transmitting pathways.

Figure 3:
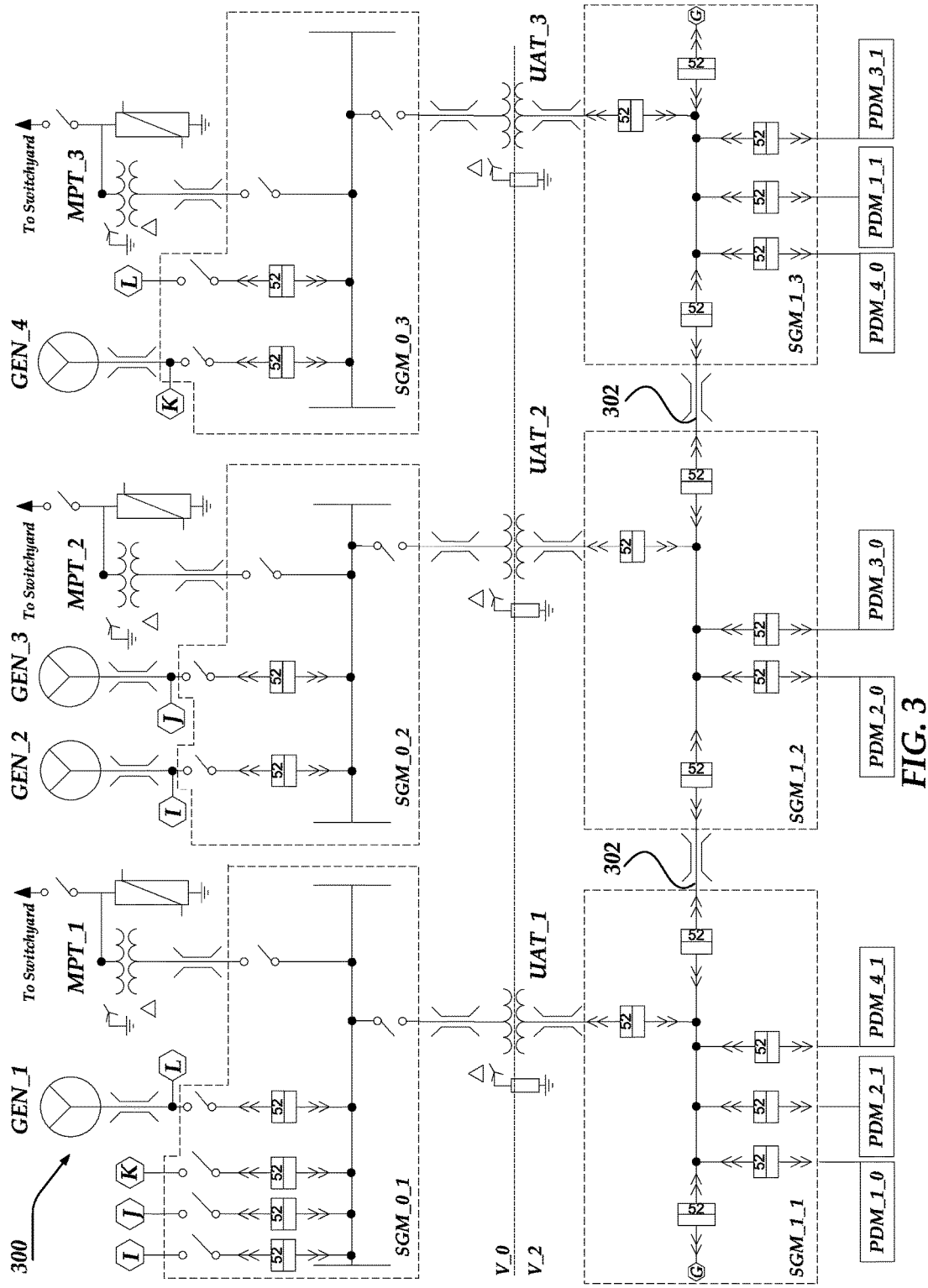
FIG. 3 shows a one-line schematic diagram for another fault-tolerant power distribution system that distributes locally generated power for the operation of a power plant that is consistent with the various embodiments discussed herein.

FIG. 3 shows a one-line schematic diagram for another fault-tolerant power distribution system 300 that distributes locally generated power for the operation of a power plant that is consistent with the various embodiments discussed herein. System 300 may include similar features to system 200 of FIG. 2. For instance, system 300 includes a similar topology to system 200 and thus includes similar fault-tolerant features. In contrast to system 200, system 300 includes four generators: GEN_1, GEN_2, GEN_3, and GEN_4. Similar to system 200, system 300 includes one or more power-distribution modules, where each of the one or more power-distribution modules corresponds to one of the four generators: GEN_1, GEN_2, GEN_3, and GEN_4. The power-distribution modules are not shown in FIG. 3.

Similar to system 200 of FIG. 2, system 300 of FIG. 3 includes at least two redundant power-distribution modules feeds for each of the power-distribution modules that correspond to a generator. The redundant power-distribution feeds provide power from the generator to the corresponding power-distribution module. Each of power-distribution feed PDM_1_0 and power-distribution feed PDM_1_1 feeds (or provides) power (generated by GEN_1) to a power-distribution module that corresponds to GEN_1. Likewise, each of power-distribution module feed PDM_2_0 and power-distribution modules feed PDM_2_2 feeds (or provides) power (generated by GEN_2) to a power-distribution module that corresponds to GEN_2. Each of power-distribution module feed PDM_3_0 and power-distribution module feed PDM_3_1 feeds (or provides) power (generated by GEN_3) to a power-distribution module that corresponds to GEN_3. Each of power-distribution module feed PDM_4_0 and power-distribution module feed PDM_4_1 feeds (or provides) power (generated by GEN_4) to a power-distribution module that corresponds to GEN_4. Each of the four generators generate a corresponding power signal.

System 300 includes three switchgear modules that are front-end modules: SGM_0_1, SGM_0_2, and SGM_0_3. System 300 also includes three switchgear modules that are backend modules: SGM_1_1, SGM_1_2, and SGM_1_3. An input of SGM_0_1 is selectively coupled to outputs of each of GEN_1, GEN_2, GEN_3, and GEN_4. An input of SGM_0_2 is selectively coupled to output of each of GEN_2 and GEN_3. An input of SGM_0_3 is selectively coupled to outputs of each of GEN_1 and GEN_4. Note, to simplify the visual representation in FIG. 3 a portion of these couplings are schematically shown by the hexagonal symbols that are marked "I," "J," "K," and "L." Further note that outputs of the generators are coupled to the inputs of front-end modules via cable bus modules.

A first main power transformer (MPT_1) is selectively coupled, via a cable bus module, to SGM_0_1. A second main power transformer (MPT_2) is selectively coupled, via another cable bus module, to SGM_0_2. A third main power transformer (MPT_3) is selectively coupled, via yet another cable bus module, to SGM_0_3. Similar to system 200, the MPTs included in system 300 transform the voltage (from V_0 to V_1) of the portion of the power signals that are transmitted to the switchyard.

An input of SGM_1_1 is selectively coupled to an output of SGM_0_1, via one or more cable bus modules. A first unit auxiliary transformer (UAT_1) is intermediate the coupling between SGM_0_1 and SGM_1_1. An input of SGM_1_2 is selectively coupled to an output of SGM_0_2, via one or more cable bus modules. A second unit auxiliary transformer (UAT_2) is intermediate the coupling between SGM_0_2 and SGM_1_2. An input of SGM_1_3 is selectively coupled to an output of SGM_0_3, via one or more cable bus modules. A third unit auxiliary transformer (UAT_3) is intermediate the coupling between SGM_0_3 and SGM_1_3. Similar to system 200, the UATs included in system 300 transform the voltage (from V_0 to V_2) of the portion of the power signals that are locally distributed within the power plant.

An input to each power-distribution module feeds PDM_1_0, PDM_2_1, and PDM_4_1 is coupled to a corresponding output SGM_1_1. An input of each power-distribution module feeds PDM_2_0 and PDM_3_0 is coupled to a corresponding output SGM_1_2. An input of each power-distribution module feeds PDM_4_0, PDM_1_1, and PDM_3_1 is coupled to a corresponding output SGM_1_3. A cable bus module couples SGM_1_1 and SGM_1_2. Another cable bus module couples SGM_1_2 and SGM_1_3. A third cable bus module (schematically represented by the hexagonal symbol labeled "G") couple SGM_1_3 and SGM_1 to form a backend bus 302.

The switchgear module bus of SGM_1_1 includes a first portion of the backend bus 302. The switchgear module bus of SGM_1_2 includes a second portion of the backend bus 302. The switchgear module bus of SGM_1_3 includes a third portion of the backend bus 302. Thus, the backend bus 302 is coupled to the inputs of each of the power-distribution module feeds.

Similar to system 200, system 300 is a fault-tolerant system and includes redundant power-transmission paths between each of the generators and the switchyard. System 300 also includes redundant power-transmission paths between each of the generators and the corresponding power-distribution module feeds. For instance, when SGM_0_1 is selected to transmit the portion of the power signal generated by GEN_1 to be locally distributed to the power plant, UAT_1 transforms the voltage of the portion of the power signal and the backend bus 302 transmits the portion of the power signal to power-distribution module feed PDM_1_0. Additionally, MPT_1 transforms the voltage of another portion of the power signal generated by GEN_1 to be transmitted to the switchyard.

Similarly, when SGM_0_3 is selected to transmit the portion of the power signal from GEN_1, UAT_3 transforms the voltage of the portion of the power signal and the backend bus 302 transmits the power signal to power-distribution module feed PDM_1_1. Additionally, MPT_3 transforms the voltage of the portion of the power signal generated by GEN_1 to be transmitted to the switchyard. Accordingly, GEN_1 is redundantly coupled to the corresponding power-distribution modules via feeds PDM_1_0 and PDM_1_1. Also, GEN_1 is redundantly coupled to the switchyard via a first power transmission path through SGM_0_1 and MPT_1 and a second power transmission path through SGM_0_3 and MPT_3. FIG. 3 shows that similar redundancies exist for each of GEN_2, GEN_3, and GEN_4.

Figure 4A:
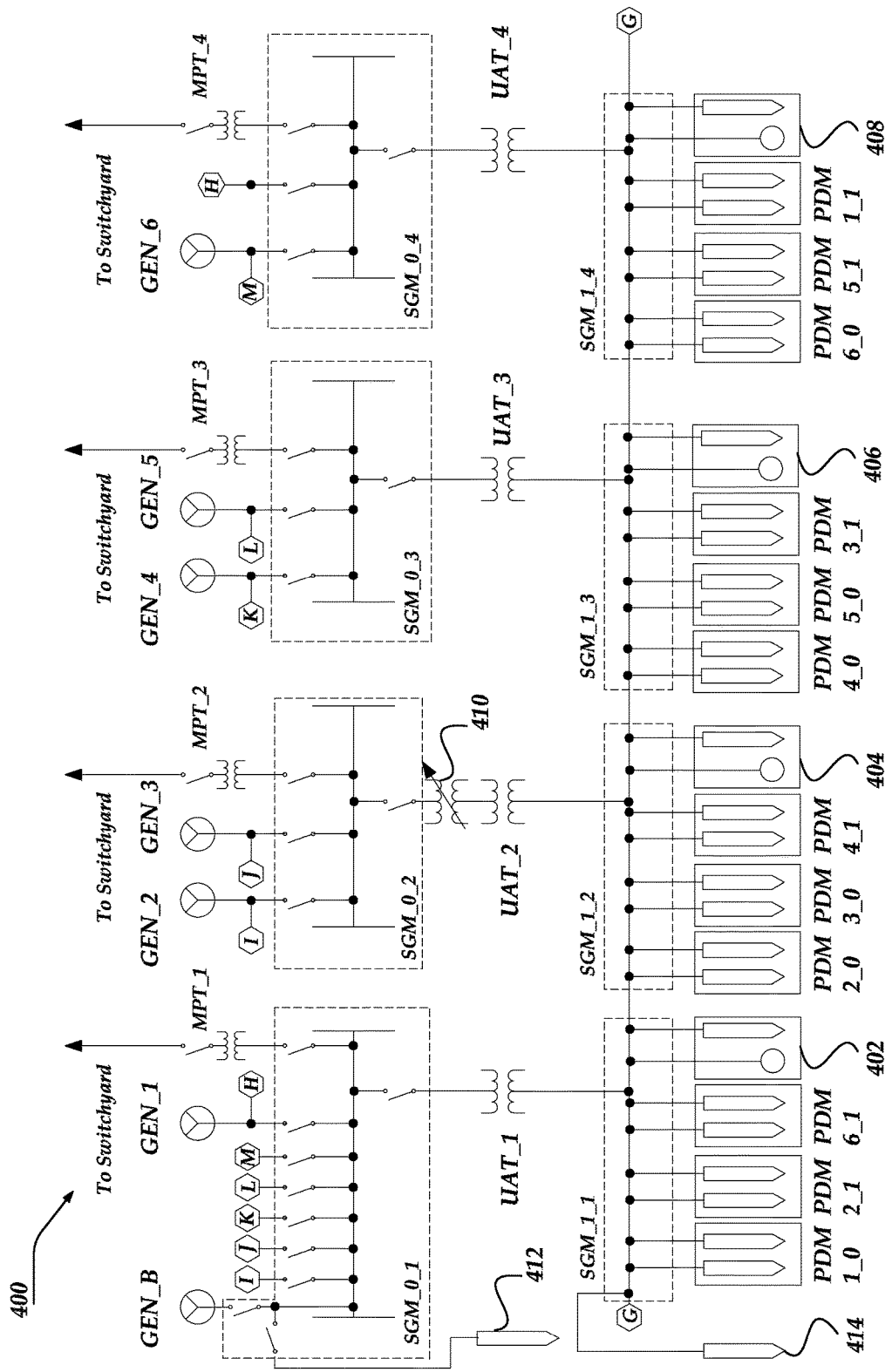
FIG. 4A shows a one-line schematic diagram for a first portion of a fault-tolerant power distribution system that distributes locally generated power for the operation of a power plant that includes twelve modular generators.
Figure 4B:
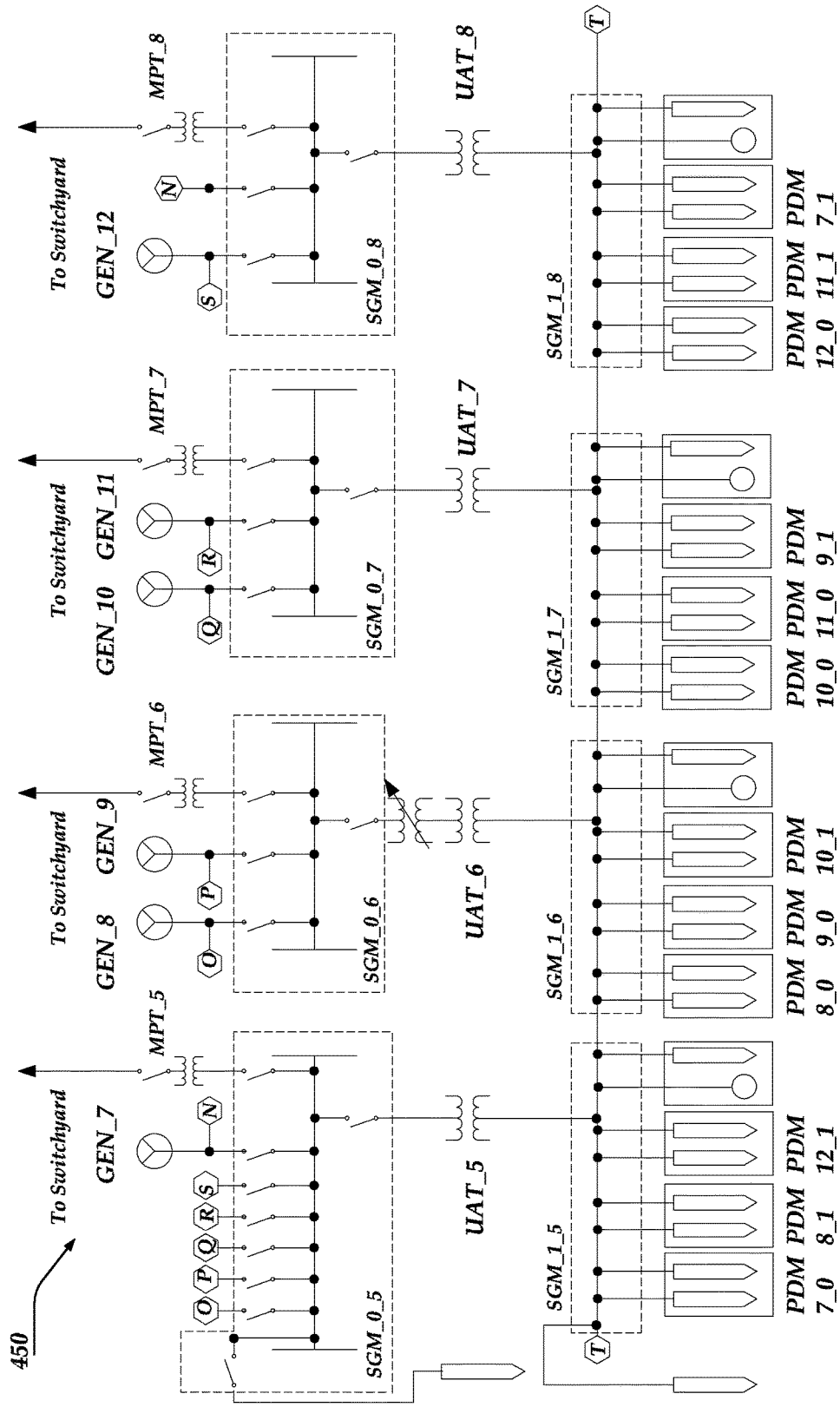
FIG. 4B shows a one-line schematic diagram for a second portion of a fault-tolerant power distribution system that distributes locally generated power for the operation of a power plant that includes twelve modular generators.

FIG. 4A shows a one-line schematic diagram for a first portion 400 of a fault-tolerant power distribution system that distributes locally generated power for the operation of a power plant that includes twelve modular generators. FIG. 4B shows a one-line schematic diagram for a second portion 450 of a fault-tolerant power distribution system that distributes locally generated power for the operation of a power plant that includes twelve modular generators.

In FIGS. 4A and 4B, some of the details regarding switchgear are shown only schematically. Accordingly, more or less switches, breakers, and other components may be included. Portion 400 of the system (FIG. 4A) may be directed towards the upper six PGM assemblies and upper six generators of power plant 150 of FIG. 1B. Portion 450 of the system (FIG. 4B) may be directed towards the lower six PGM assemblies and lower six generators of power plant 150. The system includes similar features to system 200 of FIG. 2 and system 300 of FIGS. 2-3. As such, the system is a fault tolerant system with redundant power transmission paths, power-distribution modules, main power transformers (MPTs), and unit auxiliary transformers (UATs).

Portion 400 includes six generators: GEN_1, GEN_2, GEN_3, GEN_4, GEN 5, and GEN 6. Each of the six generators is selectively coupled to at least two of four front-end switchgear modules: SGM_0_1, SGM_0_2, SGM_0_3, and SGM 0 4. A separate main power transformer (MPT) is selectively coupled to one of the four front-end switchgear modules to redundantly provide power to the switchyard. Portion 400 also includes a corresponding backend switchgear module for each of the four front-end modules: SGM_1_1, SGM_1_2, SGM_1_3, and SGM_1_4.

Each front-end switchgear module is coupled to the corresponding backend switchgear module via cable bus modules and a corresponding unit auxiliary transformer: UAT_1, UAT_2, UAT_3, and UAT_4. As shown in FIG. 4A, a voltage regulating transformer 410 may be used in combination with one or more of the UATs.

Portion 400 also includes a power-distribution module (not shown) for each of the six generators. Each of the six power-distribution modules includes at least two redundant power-distribution modules feeds. Each of power-distribution module feeds PDM_1_0 and PDM_1_1 provides power to the power-distribution module that corresponds to GEN_1. Each of power-distribution module feeds PDM_2_0 and PDM_2_1 provides power to the power-distribution module that corresponds to GEN_2. Each of power-distribution module feeds PDM_3_0 and PDM_3_1 provides power to the power-distribution module that corresponds to GEN_3. Each of power-distribution module feeds PDM_4_0 and PDM_4_1 provides power to the power-distribution module that corresponds to GEN_4. Each of power-distribution module feeds PDM_5_0 and PDM_5_1 provides power to the power-distribution module that corresponds to GEN_5. Each of power-distribution module feeds PDM_6_0 and PDM_6_1 provides power to the power-distribution module that corresponds to GEN_6. Each of these redundant power-distribution module feeds is coupled to the outputs of one of four backend switchgear modules. As discussed in at least the context of system 200 and 300, the system shown in FIGS. 4A-4B is a fault tolerant system with redundant power transmission paths, power-distribution module feeds, main power transformers (MPTs), and unit auxiliary transformers (UATs) for each of the generators.

In various embodiments, the system may include one or more backup generators (GEN_B) coupled to one or more of the front-end switchgear modules. GEN_B may be employed to provide power to the power plant in the event that one or more of the PGM assemblies and/or corresponding generators is unavailable for power generation. Feed 412 corresponding to GEN_B may be selectively coupled to at least one of the front-end modules, such as but not limited to SGM_0_1. A second feed 414 corresponding to GEN_B may be selectively coupled to one of the backend modules, such as but not limited to SGM_1_1.

The system may include power-distribution module (PDM) feeds coupled to one or more of the backend switchgear modules. For instance, power-distribution module feeds 402, 404, 406, and 408 may provide power to other power-distribution modules that distribute power to loads that are common to each of the six generators included in system portion 400. Power-distribution module feeds 402, 404, 406, and 408 may provide power to power-distribution modules for various common pumps and motors included in the power plant. Each of the various power-distribution modules may distribute power in real time. Furthermore, one or more of the distribution modules may include one or more batteries and/or battery charging units to store power for later use. Feed 412 corresponds to GEN_B may be coupled to one or more of the front-end switchgear modules. Feed 412 and feed 414 may be coupled to one or more of the backend switchgear module.

System portion 450 includes similar features to system portion 400. For instance, system portion 450 includes six generators: GEN_7, GEN_8, GEN_8, GEN_10, GEN_11, and GEN_12. Each of the six generators is selectively coupled to at least two of four front-end switchgear modules: SGM_0_5, SGM_0_6, SGM_0_7, and SGM_8. A separate main power transformer (MPT) is selectively coupled to one of the four front-end switchgear modules to redundantly provide power to the switchyard. Portion 450 also includes a corresponding backend switchgear module for each of the four front-end modules: SGM_1_5, SGM_1_6, SGM_1_7, and SGM_1 8. Each front-end switchgear module is coupled to the corresponding backend switchgear module via a corresponding unit auxiliary transformer: UAT_5, UAT_6, UAT_7, and UAT_8. As shown in FIG. 4B, a voltage regulating transformer 460 may be used in combination with one or more of the UATs.

Portion 450 also includes two power-distribution modules corresponding to each of the six generators. Each of the six power-distribution modules includes at least two redundant power-distribution modules feeds. Each of power-distribution module feeds PDM_7_0 and PDM_7_1 provides power to the power-distribution module that corresponds to GEN_7. Each of power-distribution module feeds PDM_8_0 and PDM_8_1 provides power to the power-distribution module that corresponds to GEN_8. Each of power-distribution module feeds PDM_9_0 and PDM_9_1 provides power to the power-distribution module that corresponds to GEN_9. Each of power-distribution module feeds PDM_10_0 and PDM_10_1 provides power to the power-distribution module that corresponds to GEN_10. Each of PDM_11_0 and PDM_11_1 correspond to GEN_11. Each of power-distribution module feeds PDM_12_0 and PDM_12_1 provides power to the power-distribution module that corresponds to GEN_12. Each of these redundant power-distribution module feeds is coupled to the outputs of one of four backend switchgear modules.

The above specification, examples, and data provide a complete description of the manufacture and use of the composition of the invention. Since many embodiments of the invention can be made without departing from the spirit and scope of the invention, the invention resides in the claims hereinafter appended.

The embodiments of the invention in which an exclusive property or privilege is claimed are defined as follows:

1. A fault-tolerant power distribution system for locally distributing electrical power generated in a power plant to the power plant, wherein the power plant includes a thermal source that produces thermal energy, the system comprising:
   a first generator that converts a portion of the thermal energy produced by the thermal source into a first power signal;
   a first feed and a second feed for a first distribution module that corresponds to the first generator;
   a first transmission path that when coupled to the first generator, transmits a first portion of the first power signal to the first feed, wherein the first feed provides the first portion of the first power signal to the first distribution module and the first distribution module distributes electrical energy included in the first portion of the first power signal to the power plant;
   a first switch that selectively couples and decouples the first transmission path to the first generator;
   a second transmission path that when coupled to the first generator, transmits the first portion of the first power signal to the second feed, wherein the second feed provides the first portion of the first power signal to the first distribution module; and
   a second switch that selectively couples and decouples the second transmission path to the first generator.

2. The system of claim 1, further comprising:
   a first switchgear module that includes the first switch and a first switchgear module bus that includes a first portion of the first transmission path, wherein when the first switch couples the first transmission path to the first generator, the first generator is coupled to at least a portion of the first switchgear module bus; and
   a second switchgear module that includes a second switchgear module bus that includes a first portion of the second transmission path, wherein when the second switch couples the second transmission path to the first generator, the first generator is coupled to at least a portion of the second switchgear module bus.

3. The system of claim 2, further comprising:
   a third switchgear module that includes a second portion of the first transmission path, wherein the first feed is coupled to an output of the third switchgear module;
   a first unit auxiliary transformer (UAT) that is included in the first transmission path intermediate the first and the second portions of the first transmission path, wherein when the first transmission path is coupled to the first generator, the first UAT transforms a voltage of the first portion of the first power signal from a first voltage level to a second voltage level;
   a fourth switchgear module that includes a second portion of the second transmission path, wherein the second feed is coupled to an output of the fourth switchgear module; and
   a second UAT that is included in the second transmission path intermediate the first and the second portions of the second transmission path, wherein when the second transmission path is coupled to the first generator, the second UAT transforms the voltage of the first portion of the first power signal from the first voltage level to the second voltage level.

4. The system of claim 2, further comprising:
   a first main power transformer (MPT);
   a third switch that selectively couples and decouples the first MPT to the first switchgear module bus such that when the first transmission path is coupled to the first generator and the first MPT is coupled to the first switchgear module bus, a second portion of the first power signal is transmitted to the first MPT and the first MPT transforms a voltage of the second portion of the first power signal from a first voltage level to a second voltage level;
   a second MPT; and
   a fourth switch that selectively couples and decouples the second MPT to the second switchgear module bus such that when the second transmission path is coupled to the first generator and the second MPT is coupled to the second switchgear module bus, the second portion of the first power signal is transmitted to the second MPT and the second MPT transforms a voltage of the second portion of the first power signal from the first voltage level to the second voltage level.

5. The system of claim 1, wherein the power plant further includes a second thermal source that produces thermal energy, the system further comprising:
   a second generator that converts a portion of the thermal energy produced by the second thermal source assembly into a second electrical power signal;
   a first and a second feed for a second distribution module that corresponds to the second generator;
   a third transmission path that when coupled to the second generator, transmits a first portion of the second power signal to the third feed, wherein the third feed provides the first portion of the second power signal to the second distribution module and the second distribution module distributes electrical energy included in the first portion of the second power signal to the power plant;
a third switch that selectively couples and decouples the third transmission path to the second generator;
a fourth transmission path that when coupled to the second generator, transmits the first portion of the second power signal to the fourth feed, wherein the fourth feed provides the first portion of the second power signal to the second distribution module; and
a fourth switch that selectively couples and decouples the fourth transmission path to the second generator.

6. The system of claim 5, further comprising:
a first switchgear module that includes a first switchgear module bus that includes a first portion of the first transmission path and a first portion of the fourth transmission path, wherein when the first switch couples the first transmission path to the first generator, the first generator is coupled to at least a portion of the first switchgear module bus and when the fourth switch couples the fourth transmission path to the second generator, the second generator is coupled to the portion of the first switchgear module bus; and
a second switchgear module that includes a second switchgear module bus that includes a first portion of the third transmission path and a first portion of the second transmission path, wherein when the second switch couples the second transmission path to the first generator, the first generator is coupled to at least a portion of the second switchgear module bus and when the third switch couples the third transmission path to the second generator, the second generator is coupled to the portion of the second switchgear module bus.

7. The system of claim 6, further comprising:
a third switchgear module that includes a third switchgear module bus that includes a second portion of the first transmission path that is coupled to the first feed and a second portion of the fourth transmission path that is coupled to the fourth feed, wherein when the first switch couples the first transmission path to the first generator, the first generator is coupled to at least a portion of the third switchgear module bus and when the fourth switch couples the fourth transmission path to the second generator, the second generator is coupled to the portion of the third switchgear module bus; and
a fourth switchgear module that includes a fourth switchgear module bus that includes a second portion of the third transmission path that is coupled to the second feed and a second portion of the third transmission path that is coupled to the third feed, wherein when the second switch couples the second transmission path to the first generator, the first generator is coupled to at least a portion of the fourth switchgear module bus and when the third switch couples the third transmission path to the second generator, the second generator is coupled to the portion of the fourth switchgear module bus.

8. A fault-tolerant power distribution system for locally distributing electrical power generated in a power plant to the power plant, the system comprising:
a first turbine that generates a first power signal;
a second turbine that generates a second power signal;
a first switchgear module that when coupled to the first turbine, transmits the first power signal and when coupled to the second turbine, transmits the second power signal;
a second switchgear module that when coupled to the first turbine, transmits the first power signal and when coupled to the second turbine, transmits the second power signal;
a first switch that when in a first state, couples the first turbine to the first switchgear module and when in a second state, decouples the first turbine from the first switchgear module;
a second switch that when in a first state, couples the first turbine to the second switchgear module and when in a second state, decouples the first turbine from the second switchgear module;
a third switch that when in a first state, couples the second turbine to the second switchgear module and when in a second state, decouples the second turbine from the second switchgear module;
a fourth switch that when in a first state, couples the second turbine to the first switchgear module and when in a second state, decouples the second turbine from the first switchgear module;
a first feed for a first distribution module, wherein the first feed is selectively coupled to the first switchgear module, wherein when coupled to the first switchgear module and the first switchgear module transmits the first power signal, the first feed provides the first power signal to the first distribution module and the first power distribution module distributes a portion of the first power signal to the power plant;
a second feed for the first distribution module, wherein the second feed is selectively coupled to the second switchgear module, wherein when coupled to the second switchgear module and the second switchgear module transmits the first power signal, the second feed provides the first power signal to the first distribution module and the first distribution module distributes the portion of the first power signal to the power plant;
a third feed for a second distribution module, wherein the third feed is selectively coupled to the second switchgear module, wherein when coupled to the second switchgear module and the second switchgear module transmits the second power signal, the third feed provides the second power signal to the second distribution module and the second distribution module distributes a portion of the second power signal to the power plant; and
a fourth feed for the second distribution module, wherein the fourth feed is selectively coupled to the first switchgear module, wherein when coupled to the first switchgear module and the second switchgear module transmits the second power signal, the fourth feed provides the second power signal to the second distribution module and the second distribution module distributes the portion of the second power signal to the power plant.

9. The system of claim 8, wherein the first switchgear module includes the first switch and the second switchgear module includes the third switch.

10. The system of claim 8, wherein the first switchgear module includes the fourth switch and the second switchgear module includes the second switch.

11. The system of claim 8, further comprising:
a fifth switch that when in a first state, couples the first switchgear module to the first and the fourth feeds and when in a second state, decouples the first switchgear module from the first and the fourth feeds;
a sixth switch that when in a first state, couples the second switchgear module to the second and the third feeds and when in a second state, decouples the second switchgear module from the second and the third feeds.

12. The system of claim 8, further comprising:
a third switchgear module that when coupled to the first turbine, transmits the portion of the first power signal from the first switchgear module to the first feed and when coupled to the second turbine, transmits the portion of the second power signal from the first switchgear module to the fourth feed; and
a fourth switchgear module that when coupled to the first turbine, transmits the portion of the first power signal from the second switchgear module to the second feed and when coupled to the second turbine, transmits the portion of the second power signal from the second switchgear module to the third feed.

13. The system of claim 12, further comprising:
a first unit auxiliary transformer (UAT) that when the third switchgear module is coupled to the first turbine, transforms a voltage of the portion of the first power signal that is transmitted to the first power-distribution module, and
wherein when the third switchgear module is coupled to the second turbine, the first UAT transforms a voltage of the portion of the second power signal that is transmitted to the fourth power-distribution module; and
a second UAT that when the fourth switchgear module is coupled to the first turbine, transforms the voltage of the portion of the first power signal that is transmitted to the second power-distribution module, and
wherein when the fourth switchgear module is coupled to the second turbine, the second UAT transforms the voltage of the portion of the second power signal that is transmitted to the third power-distribution module.

14. The system of claim 8, further comprising:
a fifth switch that when in a first state, couples the first switchgear module to a switchyard that is external to the system and when in a second state, decouples the first switchgear module form the switchyard such that when each of the first and the fifth switches are in the first state, another portion of the first power signal is transmitted from the first switchgear module to the switchyard and when each of the fourth and the fifth switches are in the first state, another portion of the second power signal is transmitted from the first switchgear module to the switchyard; and
a sixth switch that when in a first state, couples the second switchgear module to the switchyard and when in a second state, decouples the second switchgear module form the switchyard such that when each of the second and the sixth switches are in the first state, the other portion of the first power signal is transmitted from the second switchgear module to the switchyard and when each of the third and the sixth switches are in the first state, the other portion of the second power signal is transmitted from the second switchgear module to the switchyard.

15. A fault-tolerant power distribution system for locally distributing electrical power generated in a power plant that includes a first generator that generates a first power signal, a second generator that generators a second power signal, and a third generator that generates a third power signal, the system comprising:
a first front-end module that selectively transmits at least a portion of each of a first, the second, and the third power signals from an input of the first front-end module to an output of the first front-end module;
a second front-end module that selectively transmits the portion of the second power signal from an input of the second front-end module to an output of the second front-end module;
a third front-end module that selectively transmits the portion of each of the first and the third power signals from an input of the third front-end module to an output of the third front-end module;
a backend bus that is coupled to the outputs of each of the first, the second, and the third front-end modules and to an input of each of a first feed and a second feed for a first distribution module that corresponds to the first generator, a first feed and a second feed for a second distribution module that corresponds to the second generator, and a first feed and a second feed for a third distribution module that corresponds to the third generator, such that
when the first front-end module is selected to transmit the portion of the first power signal, the backend bus transmits the portion of the first power signal to the first feed for the first distribution module,
when the third front-end module is selected to transmit the portion of the first power signal, the backend bus transmits the portion of the first power signal to the second feed for the first distribution module,
when the second front-end module is selected to transmit the portion of the second power signal, the backend bus transmits the portion of the second power signal to the first feed for the second distribution module,
when the first front-end module is selected to transmit the portion of the second power signal, the backend bus transmits the portion of the second power signal to the second feed for the second distribution module,
when the third front-end module is selected to transmit the portion of the third power signal, the backend bus transmits the portion of the third power signal to the first feed for the third distribution module, and
when the first front-end module is selected to transmit the portion of the third power signal, the backend bus transmits the portion of the third power signal to the second feed for the third distribution module.

16. The system of claim 15, further comprising:
a first backend module that includes a first portion of the backend bus that is coupled to the first feed for the first distribution module, the second feed for the second distribution module, and the second feed for the third distribution module;
a second backend module that includes a second portion of the backend bus that is coupled to the first feed for the second distribution module; and
a third backend module that includes a third portion of the backend bus that is coupled to the second feed for the first distribution module and the first feed for the third distribution module.

17. The system of claim 16, further comprising:
a first cable bus module that electrically couples the first portion of the backend bus included in the first backend module to the second portion of the backend bus included in the second backend module;
a second cable bus module that electrically couples the second portion of the backend bus included in the second backend module to the third portion of the backend bus included in the third backend module; and
a third cable bus module that electrically couples the third portion of the backend bus included in the third backend module to the first portion of the backend bus included in the first backend module.

18. The system of claim 15, further comprising:
a first unit auxiliary transformer (UAT) that is electrically coupled to the output of the first front-end module and the backend bus;
a second UAT that is electrically coupled to the output of the second front-end module and the backend bus; and
a third UAT that is electrically coupled to the output of the third front-end module and the backend bus such that
when the first front-end module is selected to transmit the portion of the first power signal, the first UAT transforms a voltage of the portion of the first power signal that is transmitted to the first feed for the first distribution module,
when the third front-end module is selected to transmit the portion of the first power signal, the third UAT transforms the voltage of the portion of the first power signal that is transmitted to the second feed for the first distribution module,
when the second front-end module is selected to transmit the portion of the second power signal, the second UAT transforms a voltage of the portion of the second power signal that is transmitted to the first feed for the second distribution module,
when the first front-end module is selected to transmit the portion of the second power signal, the first UAT transforms the voltage of the portion of the second power signal that is transmitted to the second feed for the second distribution module,
when the third front-end module is selected to transmit the portion of the third power signal, the third UAT transforms a voltage of the portion of the third power signal that is transmitted to the first feed for the third distribution module, and
when the first front-end module is selected to transmit the portion of the third power signal, the first UAT transforms the voltage of the portion of the third power signal that is transmitted to the second feed for the third distribution module.

19. The system of claim 15, wherein:
the first front-end module includes a first switch, a second switch, a third switch, and a fourth switch that are each enabled with an open state and a closed state;
the second front-end module includes a fifth switch and a sixth switch that are each enabled with an open state and a closed state; and
the third front-end module includes a seventh switch, and eighth switch, and a ninth switch that are each enabled with an open state and a closed state such that
when each the first and the fourth switches are in the closed state and the eighth switch is in the open state, the backend bus transmits the portion of the first power signal to the first feed for the first distribution module,
when each the eighth and the ninth switches are in the closed state and the first switch is in the open state, the backend bus transmits the portion of the first power signal to the second feed for the first distribution module,
when each the fifth and the sixth switches are in the closed state and the second switch is in the open state, the backend bus transmits the portion of the second power signal to the first feed for the second distribution module,
when each the second and the fourth switches are in the closed state and the fifth switch is in the open state, the backend bus transmits the portion of the second power signal to the second feed for the second distribution module,
when each the seventh and the ninth switches are in the closed state and the third switch is in the open state, the backend bus transmits the portion of the third power signal to the first feed for the third distribution module, and
when each the third and the fourth switches are in the closed state and the seventh switch is in the open state, the backend bus transmits the portion of the third power signal to the second feed for the third distribution module.

20. The system of claim 15, wherein the power plant includes a fourth generator that generates a fourth power signal, the first front-end module further selectively transmits at least a portion of the fourth power signal from the input of the first front-end module to the output of the first front-end module, and the second front-end module further selectively transmits the portion of the fourth power signal from the input of the second front-end module to the output of the second front-end module, wherein
the backend bus is coupled to an input of each of a first feed and a second feed for a fourth distribution module that corresponds to the fourth generator, such that
when the second front-end module is selected to transmit the portion of the fourth power signal, the backend bus transmits the portion of the fourth power signal to the first feed for the fourth distribution module, and
when the first front-end module is selected to transmit the portion of the fourth power signal, the backend bus transmits the portion of the fourth power signal to the second feed for the fourth distribution module.

* * * * *